Nov. 13, 1951      J. R. STOVALL, JR      2,575,032
APPARATUS FOR CHANGING THE MECHANICAL ADVANTAGE OF A SYSTEM
Filed April 25, 1947      3 Sheets-Sheet 1
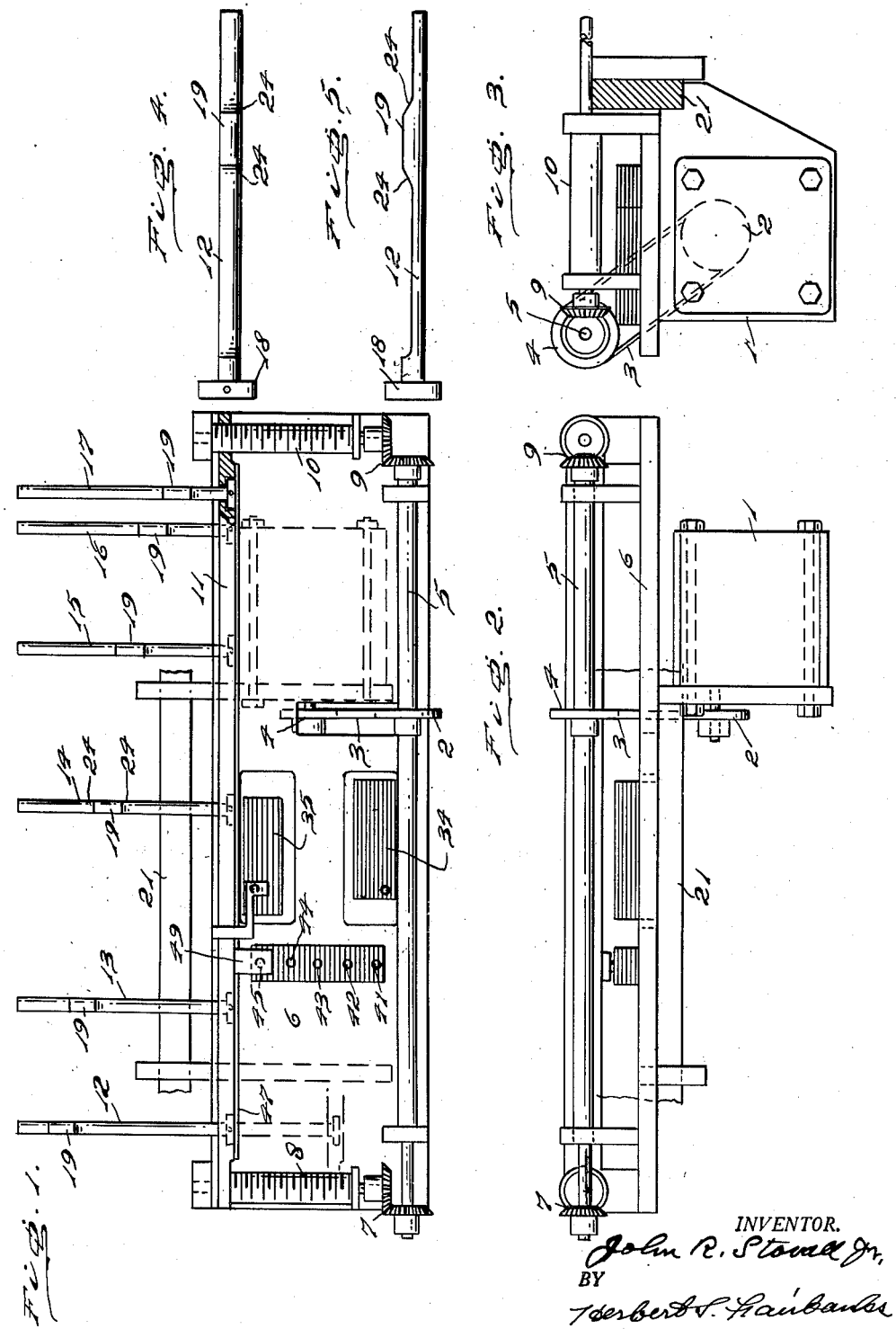
INVENTOR.
John R. Stovall Jr,
BY
Herbert V. Fairbanks
ATTORNEY.

Nov. 13, 1951  J. R. STOVALL, JR  2,575,032
APPARATUS FOR CHANGING THE MECHANICAL ADVANTAGE OF A SYSTEM
Filed April 25, 1947  3 Sheets-Sheet 2
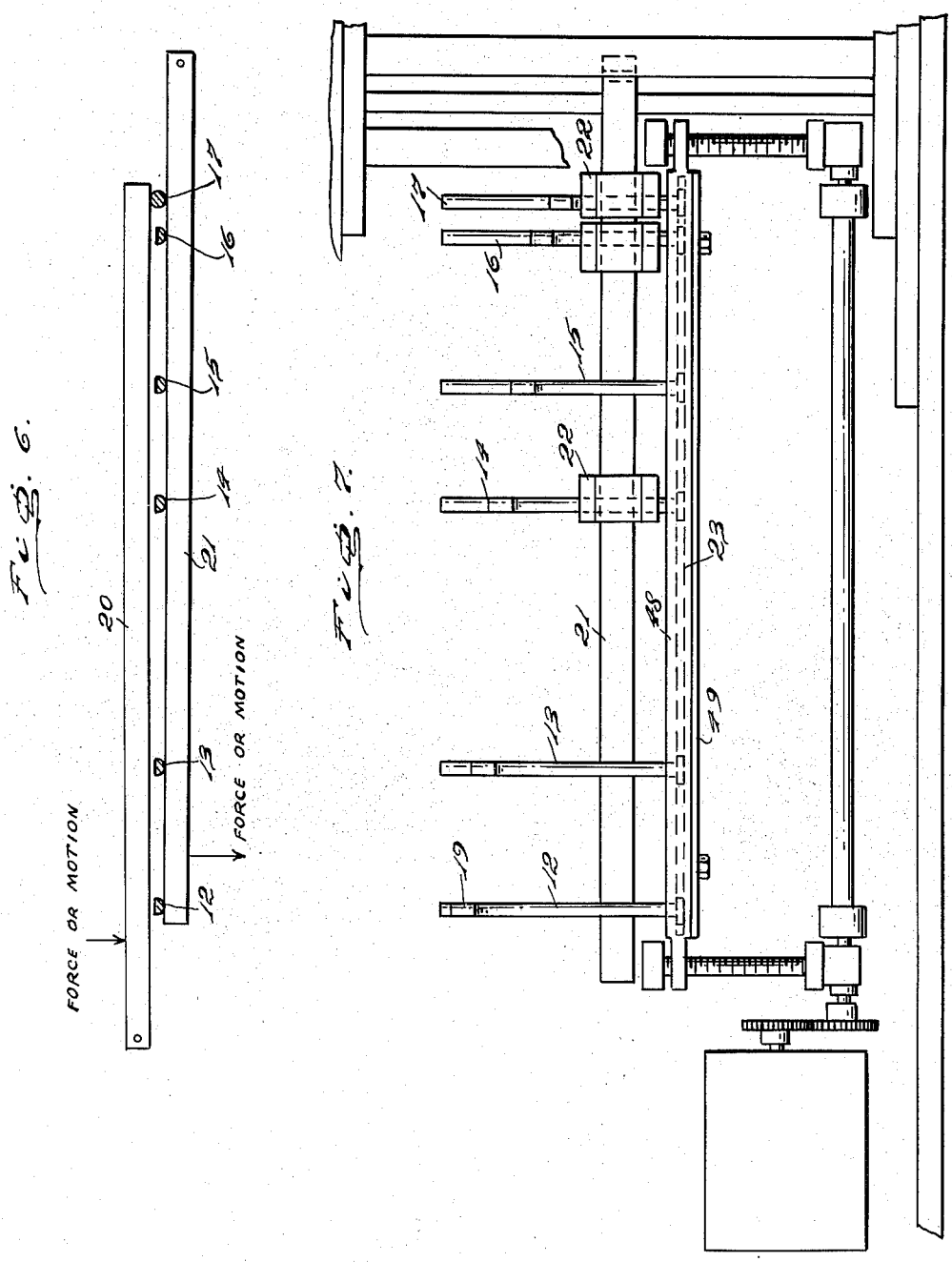
INVENTOR.
John R. Stovall, Jr.
BY
Herbert P. Fairbanks
ATTORNEY.

Nov. 13, 1951     J. R. STOVALL, JR     2,575,032
APPARATUS FOR CHANGING THE MECHANICAL ADVANTAGE OF A SYSTEM
Filed April 25, 1947     3 Sheets-Sheet 3
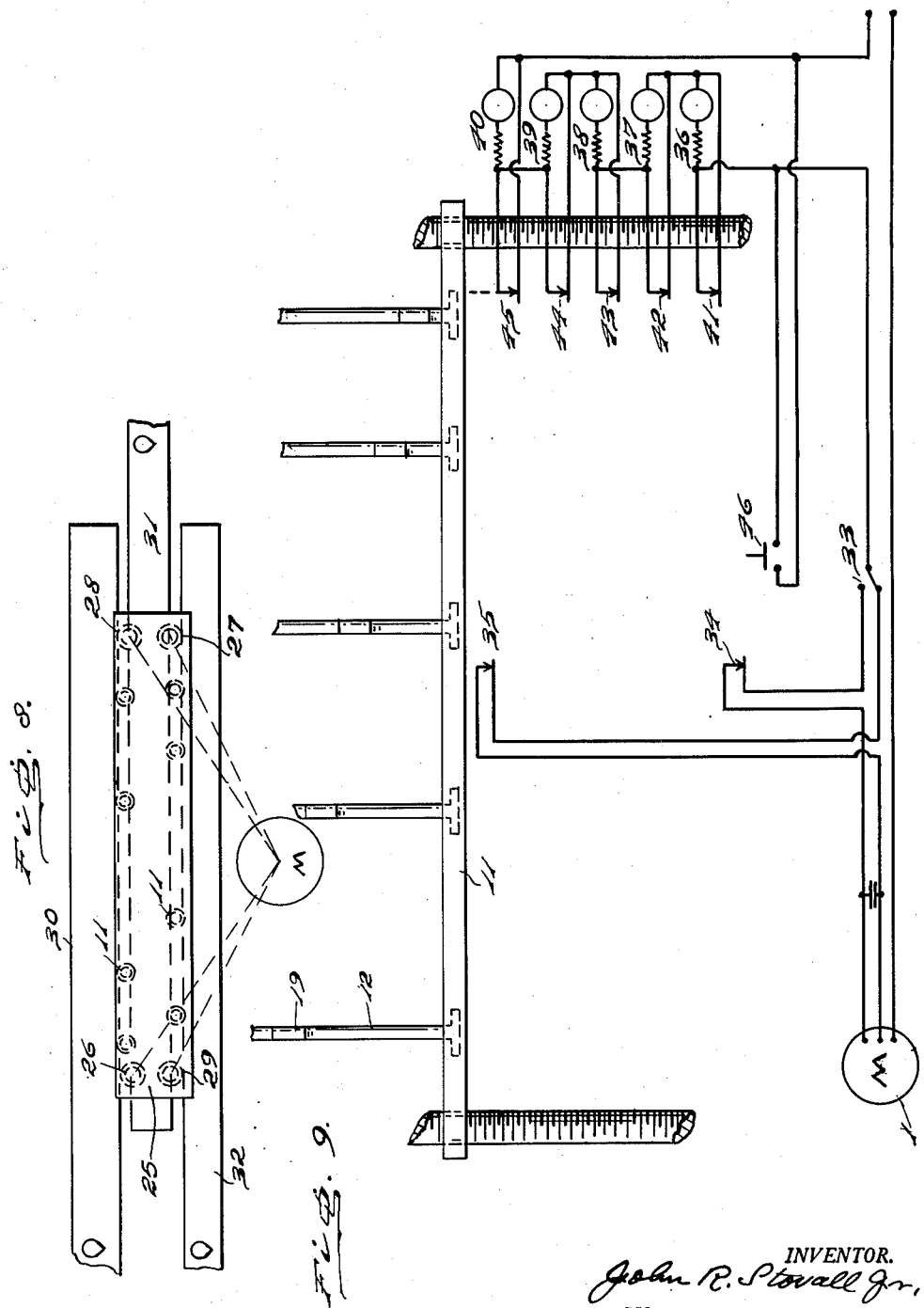
INVENTOR.
John R. Stovall Jr,
BY
Herbert S. Fairbanks
ATTORNEY.

Patented Nov. 13, 1951

2,575,032

UNITED STATES PATENT OFFICE 2,575,032

APPARATUS FOR CHANGING THE MECHANICAL ADVANTAGE OF A SYSTEM

John R. Stovall, Jr., Philadelphia, Pa., assignor to Tinius Olsen Testing Machine Company, Philadelphia, Pa., a corporation of Pennsylvania Application April 25, 1947, Serial No. 743,768

5 Claims. (Cl. 74—516)

This invention relates to an apparatus, manual, automatic or semi-automatic, to change the mechanical advantage of a system of levers, or, in general, to change the point of contact between members, and to do so, if desired, in conjunction with an indicating circuit to indicate what the status is for any condition of the apparatus.

In many applications where a force or motion is to be multiplied or divided, it is highly desirable to be able to change the mechanical advantage without any change in tare weight and to do this not only in the unloaded condition but also under load.

It is also usually desired to do this with the minimum possible power and as quickly as possible with simple panel controls and a panel indicating system. When a device is provided that does this, the utility of the system involving mechanical members is very greatly enhanced, and the versatility of the mechanical system may be made to approximate that of an electrical system where quantities may be changed by suitable switches and dials.

With the foregoing and other objects in view as will hereinafter clearly appear, my invention comprehends a novel apparatus for changing the mechanical advantage of a system without changing the tare weight.

The invention further comprehends a novel method of changing the mechanical advantage of a system under load with small energy requirements and little disturbance of the system.

It further comprehends a novel construction and arrangement of contact members and novel means to selectively position the contact members between other members to form a contact therebetween.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized, and the invention is not limited to the exact arrangement and organization of these instrumentalities as herein set forth.

Figure 1 is a top plan view of an apparatus for changing the mechanical advantage of a system, embodying my invention.

Figure 2 is a front elevation of Figure 1.

Figure 3 is an end elevation.

Figure 4 is a top plan view of a contact member.

Figure 5 is a side elevation of a contact member.

Figure 6 is a front elevation of two members with the contact members shown in Figure 7 in section.

Figure 7 is a top plan view of another embodiment of the invention.

Figure 8 is an elevation of another embodiment of the invention.

Figure 9 is a diagram of a control circuit.

Similar numerals of reference indicate corresponding parts.

Referring to the drawings:

The system herein described uses an electrical control and indicating system, with the controlling means arranged in such a way that even for large forces only a small motor, usually an instrument type control motor, is employed.

In Figures 1, 2 and 3, I have shown a typical apparatus illustrative of the principle of the invention. While this is a workable and usable arrangement, it is only one embodiment which can be used with any system of simple or compound levers, or with any system of members on which the point of contact is to be changed.

A controlled motor 1 has a pulley 2 on its shaft, and a belt 3 passes around the pulley 2 and around a pulley 4 on a shaft 5, journalled on a frame 6. The shaft 5 at one end is intergeared at 7 with a screw 8, and at the opposite end it is intergeared at 9 with a screw 10, the screws being suitably mounted on the frame. A bar 11 is in threaded engagement with the screws so that the bar can be moved back and forth thereby. The bar carries a desired number of contact rods 12, 13, 14, 15, 16 and 17. The bar may be recessed to receive heads 18 of the rods, and the rods may be pinned to the bar or allowed to rest freely in the recess with a retainer plate 47 to confine them.

Each contact rod has at a predetermined point along its length an enlarged portion 19, preferably rounded, to be moved into the space between members 20 and 21 for a chosen position of the bar 11. By locating the enlarged portions of a multiplicity of rods at different positions along the length of the rods and by having the rods movable between the members 20 and 21, it will be clear that there will be a different point of contact between members 20 and 21 for different positions of the bar 11 along its screws 8 and 10. Thus, any desired number of points of contact between members 20 and 21 may be obtained by using the desired number of contact rods. The enlarged portions of adjacent rods overlap so that there is smooth transition from one contact condition to the next.

If the contact rods are arranged to move in slotted clamps 22, see Figure 7, the point of contact between members 20 and 21 may be chosen at any location along the length of the bar 48, corresponding to the bar 11, by independently positioning each clamp 22. The bar 48 is slotted at 23 to allow unrestricted lateral movement for adjustment. This bar 48, Figure 7, is moved back and forth by a control motor which drives a shaft intergeared with screws in threaded engagement with the bar in a similar manner to that already described, and a detailed description is therefore believed to be unnecessary.

If the system is to transmit not only force but motion, the reduced section of the contact rods is made small enough to allow motion without interference.

In case the apparatus controls the contact between two members only, it is convenient to attach the apparatus to one of such members, see Figures 1, 2 and 3.

When contact between two or more members is to be controlled, it may be more convenient to attach the apparatus to any adjacent point.

When force is transmitted without motion, changing positions has the same effect as sliding a solid sheet of material of thickness equal to the diameter of the enlarged portions of the contact rods between members 20 and 21. Therefore, the power required to change position is small, depending only on the coefficient of friction of the parts and the force.

In the case where deflection is allowed in the system, the contact surfaces of the contact rods will not necessarily be in line with the contact area on the members when these are brought together in changing position. To provide smooth transition under deflection, the ends of the contact regions are sloped as at 24. For this condition, a small amount of additional power must be used to slide the member up a part of the slope.

Figure 8 shows an arrangement where more than two members are involved. The bar 11 of Figures 1 and 2 has been widened into a plate 25, and, depending on the configuration of the setup, the number of screws can be increased as shown at 26, 27, 28 and 29 to change the points of contact or the mechanical advantage of members 30, 31 and 32 of the system. These members are adapted to be pivotally supported at one end. Two contact rods are engaged simultaneously when changing positions, representing in effect two devices similar to that of Figures 1, 2 and 3 moved by the same bar expanded into a plate. The operation in all details is the same as that already described.

The contact rods as shown in Figures 4 and 5 have round enlarged sections, thus giving a line contact between members. However, the enlarged portion may be shaped as desired to give either complete line contact, line point or complete point contact.

Since the position changing may be done by a small control motor, a simple and convenient control circuit may be used as shown in Figure 9. The motor 1 may be a reversing motor of the capacitor type induction, and is reversed in the normal way by a reversing switch 33. Limit switches 34 and 35 are provided in each of the reversing leads so that the bar such as 11 or 48 may not be run past the last position in either direction. A multiplicity of indicator lights 36, 37, 38, 39 and 40, one for each position, are connected in series with a line lead of the motor. These lights are normally shorted due to the position switches 41, 42, 43, 44 and 45 being normally closed. In this condition, the motor will run in a direction determined by the reversing switch 33 until an insulated pusher 49 on the bar 11 opens one of the position switches when the next position is reached.

When this occurs, one lamp and its resistor are placed in series with the motor illuminating the lamp for that position and simultaneously dropping the voltage on the motor so that the motor stops.

To change to another desired position, the switch 33 is suitably set and the push button switch 46 pressed momentarily, shorting the energized lamp and its resistor and causing the motor to run. The motor will change the position to the next higher or lower, depending on the setting of the switch 33, then stop, illuminating the proper position lamp. Any position may be chosen by holding the push button down until past the position next to the desired position, or by pressing the button as the motor reaches an undesired position, thus causing it to move on to the desired position.

The foregoing control circuit is automatic. It is clear that the apparatus may also be arranged for manual or semi-automatic operation using the same device, with or without motor.

Having thus described my invention, what I claim as new and desire to secure by Letters Patent is:

1. Apparatus for changing the mechanical advantage of a system having movably supported members between which contact is to be made, comprising laterally spaced contact elements having contact portions at different locations along their lengths to selectively contact with said members when positioned therebetween and out of contact with each other, and means to move said contact elements to provide contact with said members at a selected location to impart a predetermined mechanical advantage to said system.

2. Apparatus for changing the mechanical advantage of a system having movably supported, spaced members between which contact is to be made, comprising contact elements having contact portions at different locations along their lengths with contact portions of adjacent contact elements in overlapping relationship but out of contact with each other, and means to move said contact elements to position a selected contact portion in contact between said members to impart a predetermined mechanical advantage to said system.

3. Apparatus for changing the mechanical advantage of a system having movably supported, spaced members between which contact is to be made, comprising contact elements having contact portions at different locations along their lengths and out of contact with each other, and an electric motor operatively connected with said contact elements to move them to selectively position a contact portion for contact between said movably supported members.

4. Apparatus for changing the mechanical advantage of a system having a plurality of spaced members, movably supported and between which contact is to be made at selected locations along their lengths to change the mechanical advantage of the system, comprising sets of contact elements having contact portions at different locations along their lengths, the contact elements of each set being arranged to move between different adjacent members of said movably supported members, and a reversible electric motor operatively connected with said sets to move them to provide selected points of contact between said plurality of movably supported members.

5. Apparatus for changing the mechanical advantage of a system having spaced members between which contact is to be made to determine the mechanical advantage of the system, comprising a series of contact rods having enlarged contact portions, a bar carrying said rods, a motor to move said bar relatively to said members, and an electric circuit controlling said motor and comprising a lamp for each rod, normally closed contacts laterally spaced at desired step positions, an individual switch resistor for each contact and remotely located from the apparatus and such that for distinct lateral positions of said bar a contact is opened and a lamp illuminated, and such that the lamp and resistor are then in series with said motor and drops its voltage to such a value that it stops, a momentary switch bridging all lamps and resistors for initiating a step, limit switches actuated by said bar at the desired travel extreme of said bar, and a motor reversing switch remotely located from the apparatus.

JOHN R. STOVALL, Jr.

REFERENCES CITED

The following references are of record in the file of this patent:

UNITED STATES PATENTS

| Number | Name | Date |
| --- | --- | --- |
| 778,044 | Kent | Dec. 20, 1904 |
| 829,068 | Fox | Aug. 21, 1906 |
| 831,404 | Ball | Sept. 18, 1906 |
| 2,037,565 | Dozier | Apr. 14, 1936 |
| 2,087,885 | Fleischel | July 27, 1937 |
| 2,161,273 | Begun | June 6, 1939 |
| 2,190,506 | Wurr | Feb. 13, 1940 |
| 2,334,834 | Newell | Nov. 23, 1943 |
| 2,362,021 | Nazar | Nov. 7, 1944 |
| 2,399,448 | Nyquist | Apr. 30, 1946 |
| 2,410,821 | Hillman | Nov. 12, 1946 |